(12) United States Patent
Vollmer et al.

(10) Patent No.: US 7,732,967 B2
(45) Date of Patent: Jun. 8, 2010

(54) ELECTRICAL MACHINE COMPRISING A WINDING SYSTEM WITH COIL GROUPS

(75) Inventors: Rolf Vollmer, Gersfeld (DE); Holger Schunk, Lendershausen (DE); Albrecht Storath, Niederlauer (DE)

(73) Assignee: Siemens Aktiengesellschaft, Munich (DE)

( * ) Notice: Subject to any disclaimer, the term of this patent is extended or adjusted under 35 U.S.C. 154(b) by 225 days.

(21) Appl. No.: 11/914,807

(22) PCT Filed: May 16, 2006

(86) PCT No.: PCT/EP2006/062325

§ 371 (c)(1),
(2), (4) Date: Nov. 19, 2007

(87) PCT Pub. No.: WO2006/122927

PCT Pub. Date: Nov. 23, 2006

(65) Prior Publication Data

US 2008/0197741 A1    Aug. 21, 2008

(30) Foreign Application Priority Data

May 17, 2005   (DE) .................. 10 2005 022 548

(51) Int. Cl.
*H02K 3/28* (2006.01)
*H02K 1/16* (2006.01)
(52) U.S. Cl. ................. 310/184; 310/216.099

(58) Field of Classification Search ......... 310/184–186, 310/216.069–216.074, 216.099–216.102, 310/254.1
See application file for complete search history.

(56) References Cited

U.S. PATENT DOCUMENTS

| 4,672,253 A | * | 6/1987 | Tajima et al. ............... 310/269 |
| 5,006,745 A | | 4/1991 | Mochizuki et al. |
| 6,879,079 B2 | * | 4/2005 | Vollmer ................... 310/254.1 |
| 7,352,099 B2 | * | 4/2008 | Schunk et al. ........ 310/216.069 |

FOREIGN PATENT DOCUMENTS

| DE | 198 24 042 A1 | 12/1999 |
| DE | 199 61 760 A1 | 7/2001 |
| DE | 101 14 014 A1 | 10/2002 |
| EP | 0 961 391 A1 | 12/1999 |
| EP | 1 422 806 A2 | 5/2004 |

* cited by examiner

*Primary Examiner*—Tran N Nguyen
(74) *Attorney, Agent, or Firm*—Henry M. Feiereisen; Ursula B. Day

(57) ABSTRACT

Disclosed is an electric machine (1) comprising a stator (2) that encompasses a winding system (10) with three winding branches, and a certain number of effective pole pairs. Each winding branch is provided with at least one coil group, each of which contains an even number of serially connected individual coils (11) that generate an individual magnetic field, respectively. Two respective individual coils (11) of a coil group are offset relative to each other in a circumferential direction of the stator (2) in such a way that the associated individual magnetic fields are provided with an offset electrical angle relative to one another at the sixth harmonic of the number of effective pole pairs, said offset electrical angle being equal to an odd multiple of 180°.

10 Claims, 4 Drawing Sheets

US 7,732,967 B2

ELECTRICAL MACHINE COMPRISING A WINDING SYSTEM WITH COIL GROUPS

BACKGROUND OF THE INVENTION

The invention relates to an electrical machine with a stator, which comprises a winding system with three winding phases, and with a pole pair number.

Such an electrical machine, which is in particular in the form of a permanent magnet synchronous machine, often has a certain degree of torque ripple during operation. In order to reduce this torque ripple, various measures are known.

DE 199 61 760 A1 has disclosed that special winding factors of the winding system arranged in slots of the stator and skewing of the slots result in a reduction in the torque ripple.

Furthermore, DE 101 14 014 A1 has disclosed a permanent magnet polyphase machine, whose stator has skewed slots for accommodating the winding system. The special embodiment of the stator and the winding system results in extensive suppression of the cogging and the fifth harmonic.

Despite these known measures, there is a need to further reduce the torque ripple. This is particularly the case when the electrical machine is intended to be produced very cost-effectively.

SUMMARY OF THE INVENTION

The object of the invention therefore consists in specifying an electrical machine of the type mentioned at the outset which has a further improved torque response with as little ripple as possible.

This object is achieved by an electrical machine according to the invention wherein
d) each winding phase contains at least one coil group,
e) each coil group contains an even number of individual coils, which are connected electrically in series and each induce an individual magnetic field, and
f) in each case two of the individual coils of a coil group are arranged offset with respect to one another in a circumferential direction of the stator in such a way that the associated individual magnetic fields in the sixth harmonic of the pole pair number have an electrical offset angle with respect to one another, which angle is equal to an odd-numbered multiple of 180°.

In the context of the invention it has been recognized that a cause of torque ripple is a fluctuation in the permeance brought about by saturation phenomena. Depending on the three-phase current presently injected into the winding system of the stator, locally limited regions can form in the stator in which the magnetic material of the stator laminate stack temporarily enters saturation. Corresponding to the temporally changing three-phase current injection, the position of these saturation regions within the stator also changes.

In particular using the simplest embodiment of a three-phase synchronous machine, which comprises two poles and a three-phase winding system arranged in in total six stator slots, it is possible to show that each current loading constellation of the three-phase current injection in total arises six times per circumference. The mentioned saturation effects therefore result in a torque ripple with the sixth harmonic. The influence of these saturation effects can be detected by additional virtual teeth being assigned to the stator. In the mentioned two-pole three-phase synchronous machine, two additional virtual teeth would need to be provided which are arranged fictitiously distributed at a uniform spacing over the circumference of the stator.

In accordance with the invention, the influence of these virtual teeth can be suppressed by reciprocal compensation of the revolving regions with local saturation. This is achieved by means of the winding system according to the invention which is particularly advantageous in this regard. The individual magnetic fields produced by the two individual coils given the pole pair number have an electrical offset angle (=phase shift) of an odd-numbered multiple of 30° and, given the sixth harmonic of the pole pair number, have an electrical offset angle of an odd-numbered multiple of 180°. The individual magnetic fields therefore cancel one another out given the sixth harmonic and therefore precisely in terms of their disadvantageous effect on the torque owing to the virtual teeth, with the result that overall a greatly improved torque response results with reduced ripple.

One variant is favorable in which the individual coils are in the form of tooth-wound coils and in particular in each case surround a tooth arranged between adjacent slots. Tooth-wound coils simplify the manufacture of the electrical machine considerably.

Furthermore, the stator for the purpose of accommodating the tooth-wound coils can have slots with side walls, the side walls of the slots, which are associated with a tooth-wound coil, being parallel to one another. The respective slots and also the tooth surrounded by the tooth-wound coil are therefore designed to have parallel flanks. This simplifies manufacture further. Prefabricated and therefore very cost-effective tooth-wound coils can then be inserted into the stator without any problems.

Preferably, the electrical machine is a permanent magnet machine, in which a rotor equipped with permanent magnets is provided. Permanent magnet machines, in particular permanent magnet synchronous machines such as synchronous motors, are nowadays often mass-produced products which have a small physical size. The space-saving tooth-wound coils which are preferably used are taken into account. The low torque ripple which can furthermore be achieved provides a cost advantage which has particular relevance especially in the case of mass-produced products.

In accordance with another variant, the stator for the purpose of accommodating the individual coils has in total 24 slots. In addition, a pole pair number $p_N$ of in particular seven is provided. A cogging pole pair number $p_R$ is therefore calculated as 168 in accordance with the following equation:

$$p_R = \text{kgV}(N, 2 \cdot p_N),$$

where kgV represents the lowest common multiple and N represents a slot number. The cogging pole pair number $p_R$ describes cogging caused by reluctance forces between permanent magnets of the rotor and teeth of the stator. The cogging pole pair number $p_R$ of 168 results in a harmonic field component of a very high order. Consequently, this harmonic field component has already been severely damped, and the associated cogging is of barely any consequence. Special suppression measures, such as skewing in the stator and/or in the rotor, for example, are therefore not required. This has a favorable effect on the production costs.

Preferably, the coil groups of each of the winding phases are connected electrically in series. This is favorable for electrical machines which are designed for a low speed.

In a further configuration, the coil groups of each of the winding phases are connected electrically in parallel. This is favorable for electrical machines which are designed for a high speed.

Also advantageous is a variant in which a rotor in the form of an external rotor or an internal rotor is provided. The above-described favorable winding system can be used in both embodiments with the mentioned advantages.

BRIEF DESCRIPTION OF THE DRAWING

Further features, advantages and details of the invention result from the description below relating to exemplary embodiments with reference to the drawing, in which.

DETAILED DESCRIPTION OF PREFERRED EMBODIMENTS

Mutually corresponding parts have been provided with the same reference symbols in FIGS. 1 to 4.

Figure 1:
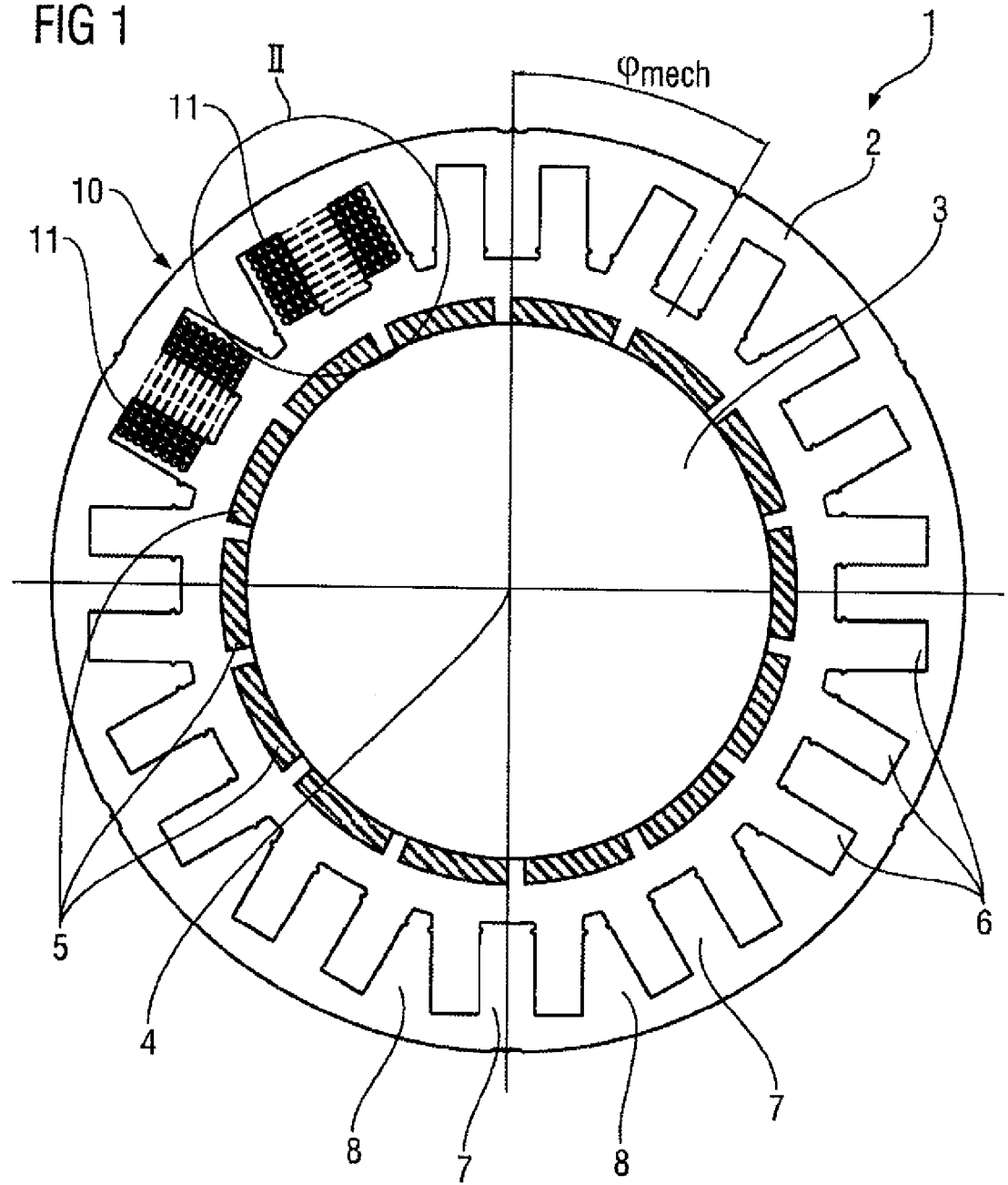
FIG. 1 shows an exemplary embodiment of an electrical machine with stator slots having parallel flanks in a cross-sectional illustration.

FIG. 1 shows an exemplary embodiment of an electrical machine 1 in a cross-sectional illustration. It is in the form of a permanent magnet synchronous motor and contains a stator 2 and a rotor 3, which is mounted such that it is capable of rotating about an axis of rotation 4. The rotor 3 is an internal rotor, which in the exemplary embodiment is provided with in total fourteen permanent magnets 5, which results in a pole pair number $p_N$ of seven. The stator 2 contains, on its inner wall facing the rotor 3, a plurality of, in the exemplary embodiment in FIG. 1 in total 24, slots 6 which are distributed uniformly over the circumference and between which in each case one tooth 7 with parallel flanks or one tooth 8 with non-parallel flanks is arranged. The teeth 7 and 8 alternate in the circumferential direction. They are connected to one another by an externally peripheral yoke. Electrical conductors 9 of a three-phase winding system 10 run within the slots 6. The winding system 10 is realized by means of tooth-wound coils 11, of which only two are shown in the cross-sectional illustration in FIG. 1 for reasons of improved clarity.

Figure 2:
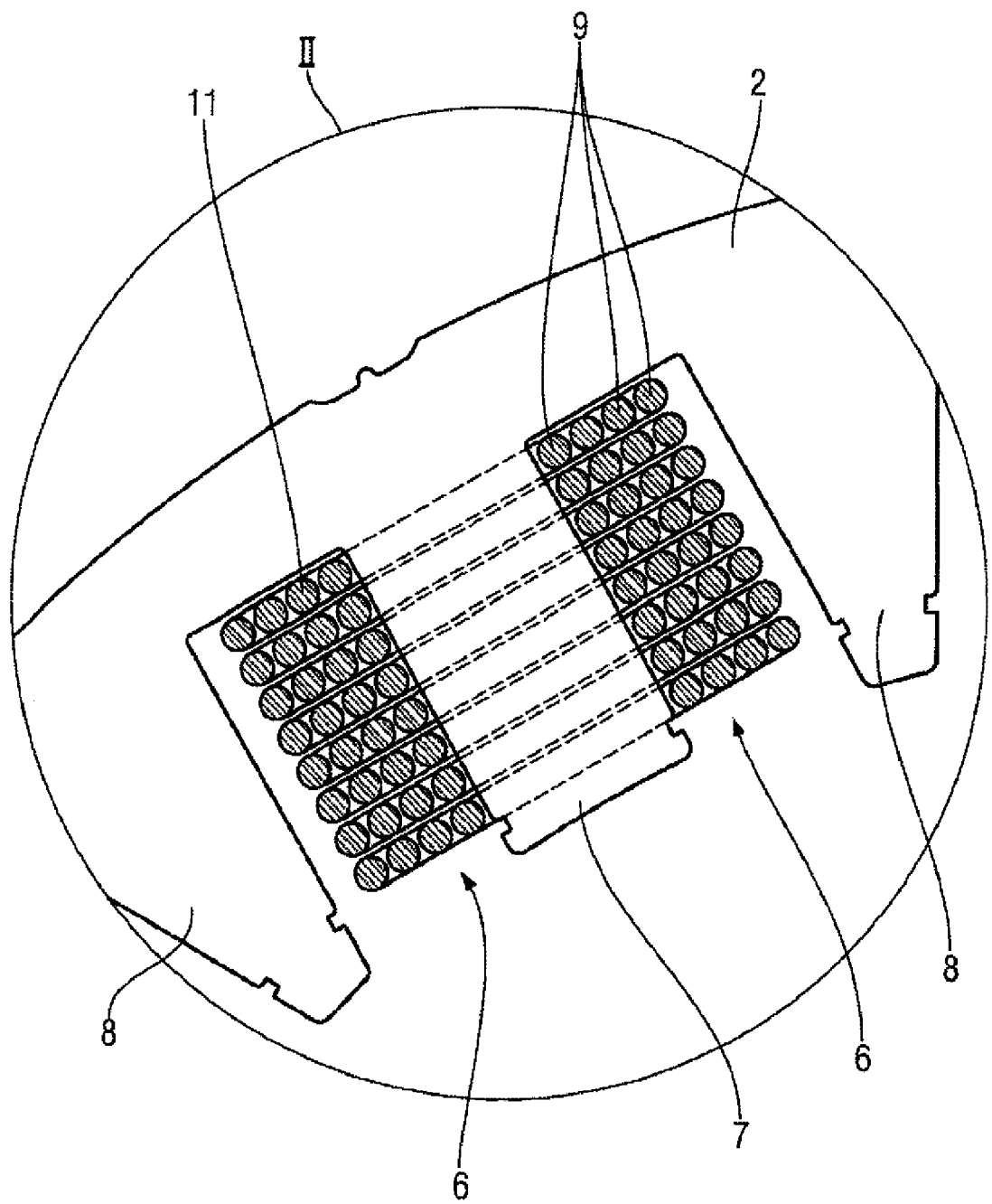
FIG. 2 shows an enlarged detail illustration of a stator slot equipped with a tooth-wound coil of the electrical machine shown in FIG. 1.

As can be seen from the enlarged detail illustration shown in FIG. 2, each of the tooth-wound coils 11 surrounds one of the teeth 7 with parallel flanks. The two adjoining slots 6 and the surrounded tooth 7 each have parallel side walls, so that the prefabricated tooth-wound coil 11 can be inserted into the laminate stack of the stator 2 without any problems. This simplifies the manufacture of the electrical machine 1 considerably. In addition, a high slot fill factor can be achieved in this way, and the electrical machine 1 can be realized in such a way that it is very compact and with a low amount of material usage.

The tooth-wound coils 11 have a single-layered design. The electrical conductors 9 of the respective tooth-wound coil turns fill the slots 6 in which they are laid substantially completely.

Figure 3:
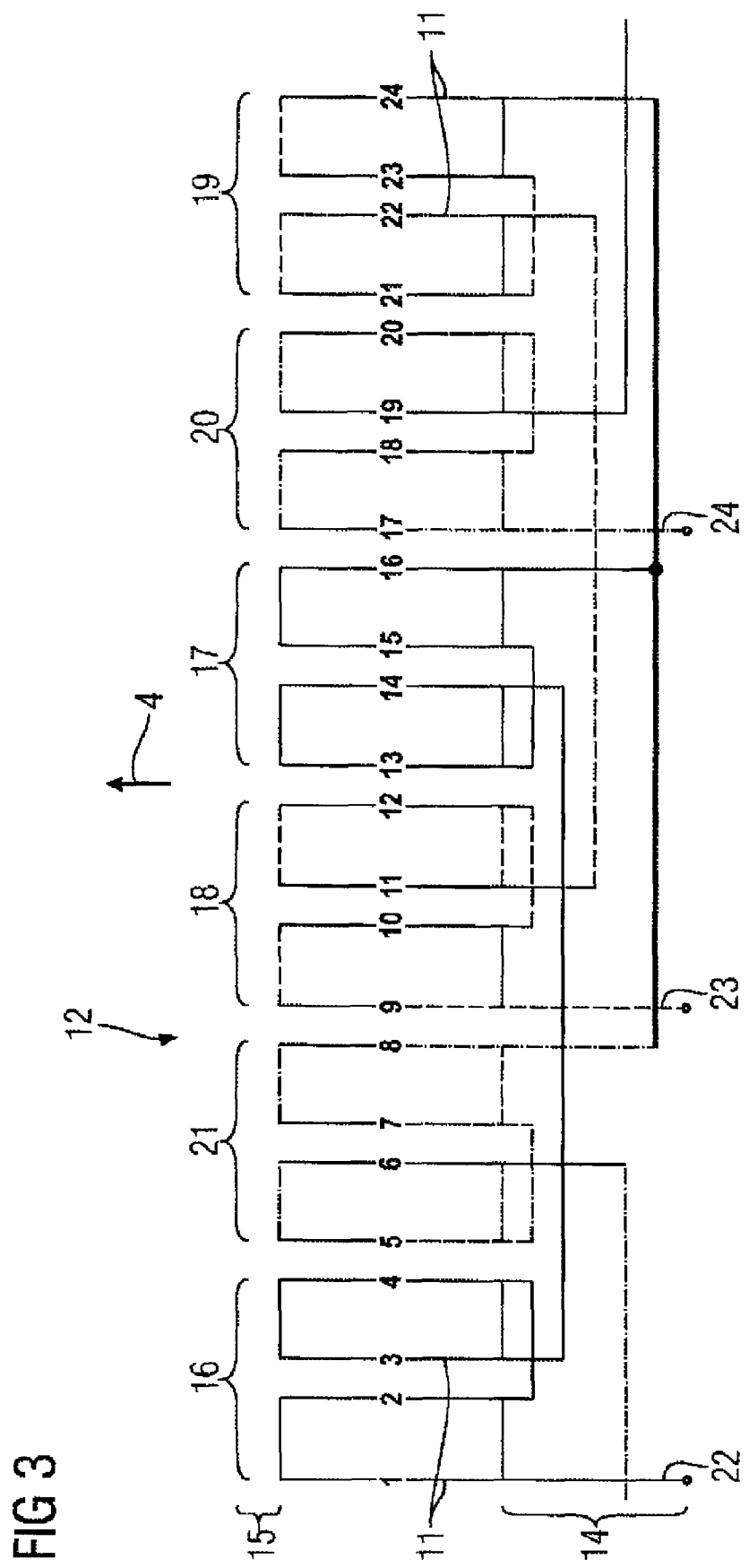
FIG. 3 shows a first exemplary embodiment of a winding scheme of the electrical machine shown in FIG. 1.
Figure 4:
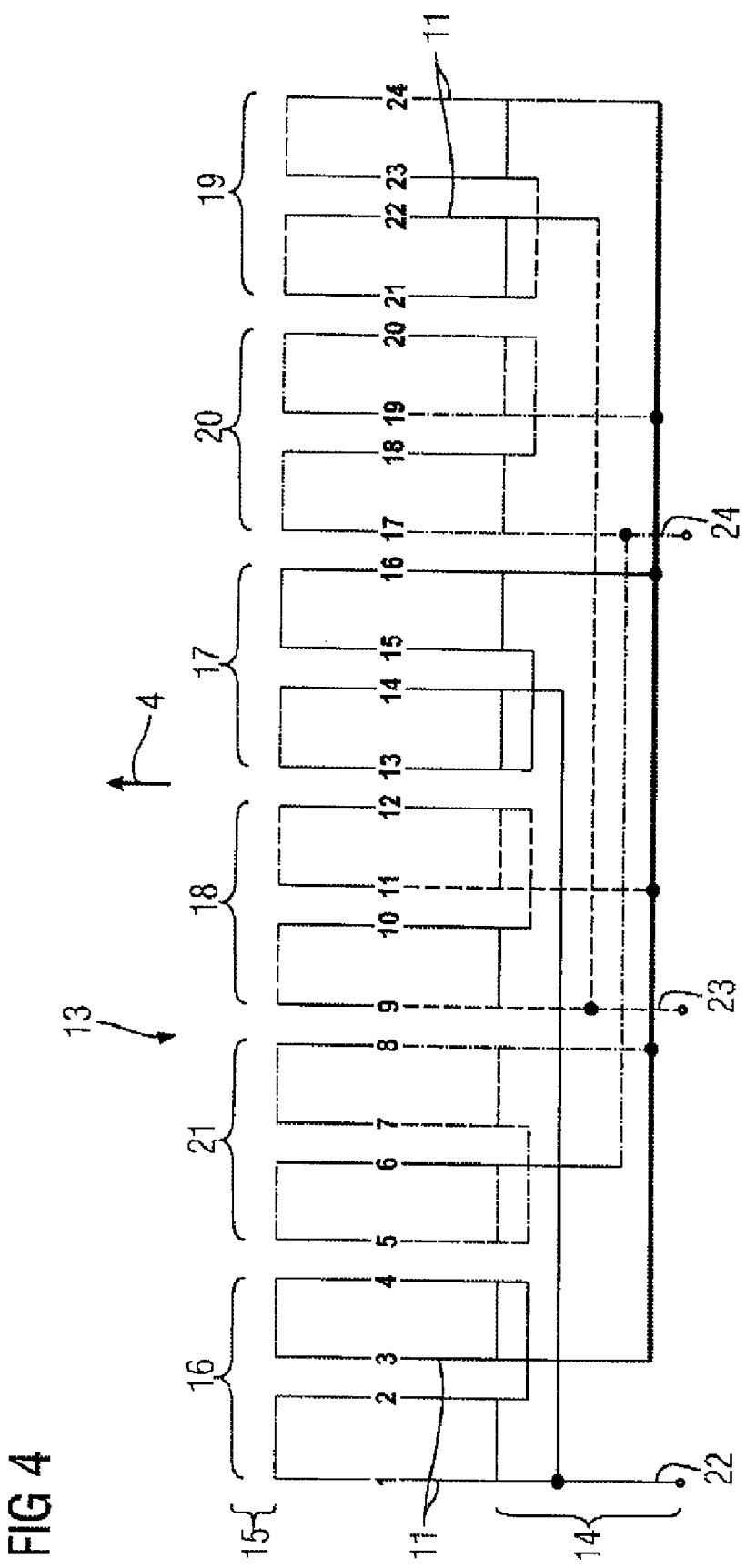
FIG. 4 shows a second exemplary embodiment of a winding scheme of the electrical machine shown in FIG. 1.

Details on the winding system 10 can be gleaned from the two simplified winding schemes shown in FIGS. 3 and 4. These FIGS. show two exemplary embodiments of a winding system 12 and 13, respectively, which are fundamentally based on the same principle, but contain different circuitry in the region of a winding head 14. As is indicated in FIGS. 3 and 4, in each case one region is provided for a winding head 14 and 15 in the axial direction, i.e. in the direction of the axis of rotation 4, on both end sides of the actual active part of the stator 2. While only the conductors 9 of the tooth-wound coil turns are deflected in the region of the winding head 15, electrical interconnection of the tooth-wound coils 11 also takes place in the region of the winding head 14. The tooth-wound coils 11 forming individual coils are combined in the two exemplary embodiments to form in total six coil groups 16 to 21, of which in each case two are associated with one of three winding phases 22 to 24. In the exemplary embodiments, the two tooth-wound coils 11 combined to form one of the coil groups 16 to 21 are arranged next to one another in the circumferential direction and such that they are offset with respect to one another by a circumferential angle $\phi_{mech}$ of 30°. They are also connected electrically in series, the two tooth-wound coils 11 being wound in opposition.

In the winding system 12 shown in FIG. 3, the coil groups 16 and 17, 18 and 19 and 20 and 21, which are associated with one of the winding phases 22 to 24, are connected electrically in series, whereas they are connected electrically in parallel in the winding system 13 shown in FIG. 4. The first winding phase 22 is illustrated by a continuous line, the second winding phase 23 is illustrated by a dashed line and the third winding phase 24 is illustrated by a dash-dotted line.

Taking into consideration the continuous numbering additionally used in FIGS. 3 and 4 for the slots 6, the following construction results for the winding system 12 or 13:

The first winding phase 22 contains the first coil group 16 with two tooth-wound coils 11, whose conductors 9 run in the first and second or in the third and fourth slot 6, and the second coil group 17 with two tooth-wound coils 11, whose conductors run in the thirteenth and fourteenth or in the fifteenth and sixteenth slot 6.

The second winding phase 23 contains the third coil group 18 with two tooth-wound coils 11, whose conductors 9 run in the ninth and tenth or eleventh and twelfth slot 6, and the fourth coil group 19 with two tooth-wound coils 11, whose conductors 9 run in the twenty-first and twenty-second or twenty-third and twenty-fourth slot 6. The third winding phase 24 contains the fifth coil group 20 with two tooth-wound coils 11, whose conductors 9 run in the seventeenth and eighteenth or in the nineteenth and twentieth slot 6, and the sixth coil group 21 with two tooth-wound coils 11, whose conductors 9 run in the fifth and sixth or in the seventh and eighth slot 6.

Each of the winding phases 22 to 24 contains pairs of tooth-wound coils 11, which are arranged offset with respect to one another by half a circumferential rotation. In the winding phase 22, these are, for example, the two tooth-wound coils 11, whose conductors 9 run in the first and second or in the thirteenth and fourteenth slot 6. The two tooth-wound coils 11 of such pairs are each wound in opposition in order to prevent reciprocal compensation of the individual magnetic fields produced by the two tooth-wound coils 11 given the pole pair number $p_N$.

In the text which follows, the way in which the electrical machine 1 and primarily also the particularly advantageous winding systems 12 and 13 function will be described.

During operation, the electrical machine 1 may have an undesirable torque ripple, for which there are various possible causes.

Firstly, reluctance forces between the permanent magnets 5 and the teeth 7 or 8 cause cogging with a cogging pole pair number $p_R$. The latter is determined by the pole pair number $p_N$ and the number N of slots 6 in the stator 2. In the exemplary embodiment, $p_N$ has a value of 7 and N a value of 24. The cogging pole pair number $p_R$ therefore assumes a high value of 168, so that the associated field component is severely damped and the cogging can virtually be ruled out as a cause for the torque ripple.

In addition to cogging, there is a further cause for the undesirable torque ripple. This is temporally and locally variable saturation phenomena in the stator 2, which occur locally to a very limited extent, depend on the current injected into the winding system 10, 12, or 13 and can also revolve in the circumferential direction. These saturation phenomena cause fluctuations in the permeance and result in a torque ripple in the sixth harmonic of the pole pair number $p_N$. The saturation influence can be described by the fictitious introduction of additional virtual teeth in the stator 2.

The special winding systems 12 and 13 suppress the formation of the saturation regions and therefore the virtual teeth to a large extent, so that very little torque ripple results.

The tooth-wound coils 11 in each case produce an individual magnetic field. Owing to the arrangement offset in the circumferential direction, the individual magnetic fields of the tooth-wound coils 11 associated with one of the coil groups 16 to 21 have an electrical offset angle $\phi_{el}$. The latter is equal to an odd-numbered multiple of 180° given the sixth harmonic of the pole pair number $p_N$ which is critical for the influence of the virtual teeth, with the result that these individual magnetic fields cancel one another out in the sixth harmonic.

The condition to be met for the sixth harmonic is therefore:

$$\phi_{el} = \phi_{mech} \cdot 6 \cdot p_N = (2 \cdot n - 1) \cdot 180° \text{ where } n \in \{1, 2, 3, \ldots\}.$$

This condition is met in the exemplary embodiment where $p_N = 7$ and $\phi_{mech} = 30°$.

Owing to the advantageous configuration of the winding systems 12 and 13, the unfavorable influence of the virtual teeth on the torque ripple of the electrical machine 1 therefore does not arise. The function principle described above using the specific example for $N=24$ and $p_N=7$ is not restricted to this application case. It can be generalized.

For example it is easily possible to multiply the slot number N. When doubling the slot number N, four coil groups with in each case two tooth-wound coils or two coil groups with in each case four tooth-wound coils can be provided per winding phase.

It is important that another corresponding individual coil is provided for each individual coil, the respective individual magnetic fields of said other individual coil cancelling one another out in the sixth harmonic of the pole pair number $p_N$. In particular, the individual magnetic fields in the sixth harmonic of the pole pair number $p_N$ have an electrical offset angle $\phi_{el}$ that is an odd-numbered multiple of 180°. Preferably, this condition needs to be met with coil groups which have an even number of individual coils.

Other, in particular odd-numbered pole pair numbers $p_N$ can be set, for example, by means of the number of permanent magnets 5 provided on the rotor 3.

Overall, the electrical machine 1 provides the possibility, which is favorable in terms of manufacturing aspects, of using tooth-wound coils 11. There is no need for otherwise conventional cost-intensive measures such as skewing or staggering of the slots 6 or the permanent magnets 5. Nevertheless, very little torque ripple results owing to the favorable properties of the winding system 10, 12 or 13. In particular the winding system 10, 12 or 13 suppresses the influence of the virtual teeth, so that they do not make any contribution to the torque ripple.

What is claimed is:

1. An electric machine, comprising a stator including a winding system having three winding phases, and a pole pair number, wherein each winding phase contains at least one coil group, with each coil group containing an even number of individual coils which are connected electrically in series and each induce an individual magnetic field, wherein two of the individual coils of each coil group are arranged offset with respect to one another in a circumferential direction of the stator in such a way that the associated individual magnetic fields in the sixth harmonic of the pole pair number have an electrical offset angle with respect to one another, with the angle being equal to an odd-numbered multiple of 180°, and wherein the stator includes a plurality of teeth, with only every second tooth being wound with one of the individual coils.

2. The electric machine of claim 1, wherein the individual coils are in the form of tooth-wound coils.

3. The electric machine of claim 2, wherein the stator has slots with side walls for accommodating the tooth-wound coils, said side walls of the slots which are associated with a tooth-wound coil, being parallel to one another.

4. The electric machine of claim 1, further comprising a rotor provided with permanent magnets for interaction with the stator.

5. The electric machine of claim 1, wherein the stator has a total of 24 slots for accommodating the individual coils, wherein the pole pair number assumes the value of seven.

6. The electric machine of claim 1, wherein the coil groups of each of the winding phases are connected electrically in series.

7. The electric machine of claim 1, wherein the coil groups of each of the winding phases are connected electrically in parallel.

8. The electric machine of claim 1, further comprising a rotor constructed in the form of an external rotor or an internal rotor for interaction with the stator.

9. An electric machine, comprising a stator including a winding system having three winding phases, and a pole pair number, wherein each winding phase contains at least one coil group, with each coil group containing an even number of individual coils which are connected electrically in series and each induce an individual magnetic field, each individual coil in a coil group being wound in opposition to an individual coil that is next to it in a circumferential direction, wherein two of the individual coils of each coil group are arranged offset with respect to one another in a circumferential direction of the stator in such a way that the associated individual magnetic fields in the sixth harmonic of the pole pair number have an electrical offset angle with respect to one another, with the angle being equal to an odd-numbered multiple of 180°, and wherein the stator includes a plurality of teeth, with only every second tooth being wound with one of the individual coils.

10. The electric machine of claim 1 wherein the stator has 12 coils and the rotor has 14 poles.

* * * * *